US012643595B2

(12) United States Patent
Shin

(10) Patent No.: US 12,643,595 B2
(45) Date of Patent: Jun. 2, 2026

(54) VEHICLE STEERING DEVICE

(71) Applicant: HL MANDO CORPORATION,
Gyeonggi-do (KR)

(72) Inventor: Donghun Shin, Seoul (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 423 days.

(21) Appl. No.: 18/387,699

(22) Filed: Nov. 7, 2023

(65) Prior Publication Data

US 2024/0367710 A1 Nov. 7, 2024

(30) Foreign Application Priority Data

May 3, 2023 (KR) ......................... 10-2023-0057758

(51) Int. Cl.
B62D 5/04 (2006.01)
(52) U.S. Cl.
CPC ......... B62D 5/0442 (2013.01); B62D 5/0424
(2013.01)
(58) Field of Classification Search
CPC ............................ B62D 5/0042; B62D 5/0424
USPC ......................................................... 180/444
See application file for complete search history.

(56) References Cited

U.S. PATENT DOCUMENTS

2022/0250672 A1* 8/2022 Han ..................... B62D 5/0403

FOREIGN PATENT DOCUMENTS

| CN | 1264454 | A | * | 8/2000 | .......... F01C 21/0863 |
|---|---|---|---|---|---|
| JP | 2005329913 | A | * | 12/2005 | |
| KR | 10-0625072 | | | 9/2006 | |
| KR | 10-0732900 | | | 6/2007 | |
| KR | 10-0738471 | | | 7/2007 | |
| KR | 10-2012-0130649 | | | 12/2012 | |
| KR | 10-2020-0100938 | | | 8/2020 | |
| KR | 10-2022-0114682 | | | 8/2022 | |

OTHER PUBLICATIONS

Notice of Allowance dated Apr. 4, 2025 for Korean Patent Application No. 10-2023-0057758 and its English translation from Global Dossier.

* cited by examiner

*Primary Examiner* — Jacob D Knutson
(74) *Attorney, Agent, or Firm* — WOMBLE BOND DICKINSON (US) LLP

(57) ABSTRACT

A vehicle steering device comprises a motor comprising a motor shaft having a large diameter portion and a small diameter portion axially extending from an end portion of the large diameter portion and having a fitting groove on an outer circumferential surface thereof, a guide bushing having a hollow shape and coupled to the small diameter portion of the motor shaft, a driving pulley axially movably disposed on the guide bushing and having a support groove on an inner circumferential surface thereof at a position corresponding to the fitting groove of the motor shaft, and a supporting member coupled to the guide bushing and protruding outward and inward from outer and inner circumferential surfaces of the guide bushing to inserted in the support groove and the fitting groove, respectively.

20 Claims, 12 Drawing Sheets

1

VEHICLE STEERING DEVICE

CROSS-REFERENCE TO RELATED APPLICATION

This application claims priority from Korean Patent Application No. 10-2023-0057758, filed on May 3, 2023, which is hereby incorporated by reference for all purposes as if fully set forth herein.

BACKGROUND

Technical Field

The present disclosure generally relates to a vehicle steering device that is capable of allowing steering of a vehicle to be performed by a motor.

Description of Related Art

An automobile steering device may have a steering link mechanism that steers wheels according to manipulation of a steering wheel and a belt-type motor device assisting the manipulation force of the steering wheel.

The belt-type motor device includes a belt for connecting a motor shaft and a ball nut and transfers the power generated from the motor to the rack bar via a belt in proportion to the torque applied to the steering wheel.

This belt-type motor device has the advantage of preventing the vibration and impact of the rack bar from being directly transferred to the motor but may cause vibrations in the belt due to the tension variations and fail to transfer the driving force of the motor to the rack bar due to the slip of the belt on the pulley.

Moreover, in the belt-type motor device, as the motor shaft rotates to drive the belt and rotate the ball nut upon steering, a force is applied between the belt and the pulley in the axial direction of the motor shaft, causing the belt to axially slip off the belt.

As the belt slips off in the axial direction of the motor shaft, the driving force from the motor may not be transferred to the rack bar, so that appropriate steering may not be achieved.

BRIEF SUMMARY

Some embodiments of the present disclosure may provide a vehicle steering device that may prevent belt slip-off, noise, and damage to the belt by allowing a driving pulley to be axially moved to support the belt when an axial load occurs between the belt and the driving pulley as a motor shaft rotates.

In an aspect, the present embodiments may provide a vehicle steering device comprising a motor provided with a motor shaft having a large diameter portion and a small diameter portion axially extending from an end portion of the large diameter portion to a side and having a fitting groove in an outer circumferential surface thereof, a guide bushing formed to have a hollow and coupled to the small diameter portion, a driving pulley installed on the guide bushing to be axially movable and having a support groove in an inner circumferential surface thereof at a position corresponding to the fitting groove, and a supporting member coupled to the guide bushing, protruding outward of an outer circumferential surface of the guide bushing, protruding inward of an inner circumferential surface of the guide bushing to fit into the fitting groove and the support groove.

In the present embodiments, the motor includes a plurality of fitting grooves continuously formed in an outer circumferential surface of the small diameter portion from one side to another side along a circumferential direction. The guide bushing includes a plurality of slits cut through an inner circumferential surface and outer circumferential surface thereof, at positions corresponding to the fitting grooves, along the circumferential direction. The driving pulley includes a plurality of support grooves formed in an inner circumferential surface thereof, at positions corresponding to the fitting grooves continuously from one side to another side, along the circumferential direction. The supporting member includes a support pin protruding outward of the outer circumferential surface of the guide bushing and protruding inward of the inner circumferential surface of the guide bushing to fit into the fitting groove and the support groove.

In the present embodiments, the slits are continuously formed from one side to another side of the guide bushing. The support pin is axially elongated to be fitted into the slit.

In the present embodiments, the motor includes a plurality of fitting grooves continuously formed in an outer circumferential surface of the small diameter portion from one side to another side along a circumferential direction. The guide bushing includes a plurality of through holes formed through an inner circumferential surface and outer circumferential surface thereof, at positions corresponding to the fitting grooves, along the circumferential direction. The driving pulley includes a plurality of support grooves formed in an inner circumferential surface thereof, at positions corresponding to the fitting grooves continuously from one side to another side, along the circumferential direction. The supporting member includes a support ball protruding outward of the outer circumferential surface of the guide bushing and protruding inward of the inner circumferential surface of the guide bushing to fit into the fitting groove and the support groove.

In the present embodiments, the plurality of through holes are formed from one side to another side of the guide bushing. The support ball is formed in a ball shape and is fitted into the through hole.

In the present embodiments, the vehicle steering device further comprises a first elastic member formed to have a hollow and coupled to the small diameter portion to support the guide bushing and one side of the driving pulley.

In the present embodiments, the first elastic member has an outer diameter that reduces from one side to another side.

In the present embodiments, the vehicle steering device further comprises a second elastic member formed to have a hollow and coupled to the small diameter portion to support the guide bushing and another side of the driving pulley.

In the present embodiments, the second elastic member has an outer diameter that increases from one side to another side.

In the present embodiments, the vehicle steering device further comprises a fastening member coupled to one end portion of the small diameter portion to support one side of the first elastic member.

In the present embodiments, the driving pulley is moved to one axial side if the motor shaft is rotated in one direction to generate an axial load to one side, is moved to another axial side if the motor shaft is rotated in an opposite direction to generate an axial load to another side, and is positioned between the first elastic member and the second elastic member by an elastic force of the first elastic member and the second elastic member if no axial load is generated.

In another aspect, the present embodiments may provide a vehicle steering device comprising a motor provided with a motor shaft having a large diameter portion and a small diameter portion axially extending from an end portion of the large diameter portion to a side, a guide bushing formed to have a hollow, coupled to the small diameter portion, and having an outer support portion protruding from an outer circumferential surface thereof, and a driving pulley installed on the guide bushing to be axially movable and having a support groove formed in an inner circumferential surface thereof, at a position corresponding to the outer support portion, to allow the outer support portion to be fitted thereinto.

In the present embodiments, a plurality of outer support portions are continuously formed on an outer circumferential surface of the guide bushing along a circumferential direction to radially protrude from one side to another side. A plurality of support grooves are continuously formed in an inner circumferential surface of the driving pulley along the circumferential direction from one side to another side to correspond to the outer support portions.

In the present embodiments, the motor includes a plurality of fitting grooves that are continuously formed in an outer circumferential surface of the small diameter portion from one side to another side along a circumferential direction. The guide bushing includes of a plurality inner support portions continuously formed on an inner circumferential surface thereof along the circumferential direction at positions corresponding to the fitting grooves to radially protrude from one side to another side to be fitted into the fitting grooves.

In the present embodiments, the vehicle steering device further comprises a first elastic member formed to have a hollow and coupled to the small diameter portion to support the guide bushing and one side of the driving pulley.

In the present embodiments, the first elastic member has an outer diameter that reduces from one side to another side.

In the present embodiments, the vehicle steering device further comprises a second elastic member formed to have a hollow and coupled to the small diameter portion to support the guide bushing and another side of the driving pulley.

In the present embodiments, the second elastic member has an outer diameter that increases from one side to another side.

In the present embodiments, the vehicle steering device further comprises a fastening member coupled to one end portion of the small diameter portion to support one side of the first elastic member.

In the present embodiments, the driving pulley is moved to one axial side if the motor shaft is rotated in one direction to generate an axial load to one side, is moved to another axial side if the motor shaft is rotated in an opposite direction to generate an axial load to another side, and is positioned between the first elastic member and the second elastic member by an elastic force of the first elastic member and the second elastic member if no axial load is generated.

According to certain embodiments of the present disclosure, there may be provided a vehicle steering device that may prevent belt slip-off, noise, and damage to the belt by allowing a driving pulley to be axially moved to support the belt when an axial load occurs between the belt and the driving pulley as a motor shaft rotates.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
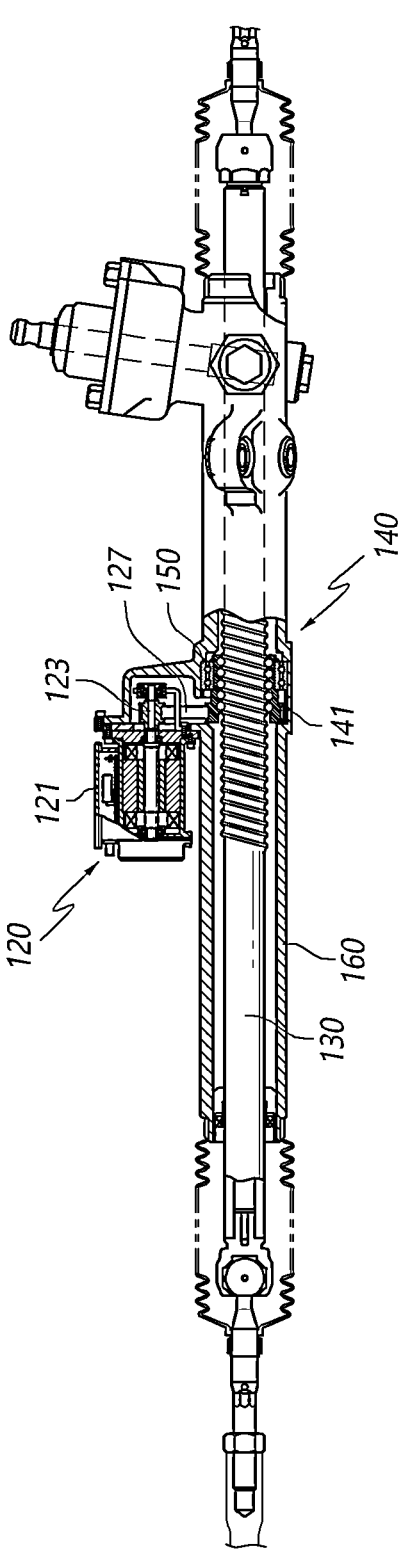
FIG. 1 is a partial cross-sectional view illustrating a vehicle steering device according to an embodiment of the present disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
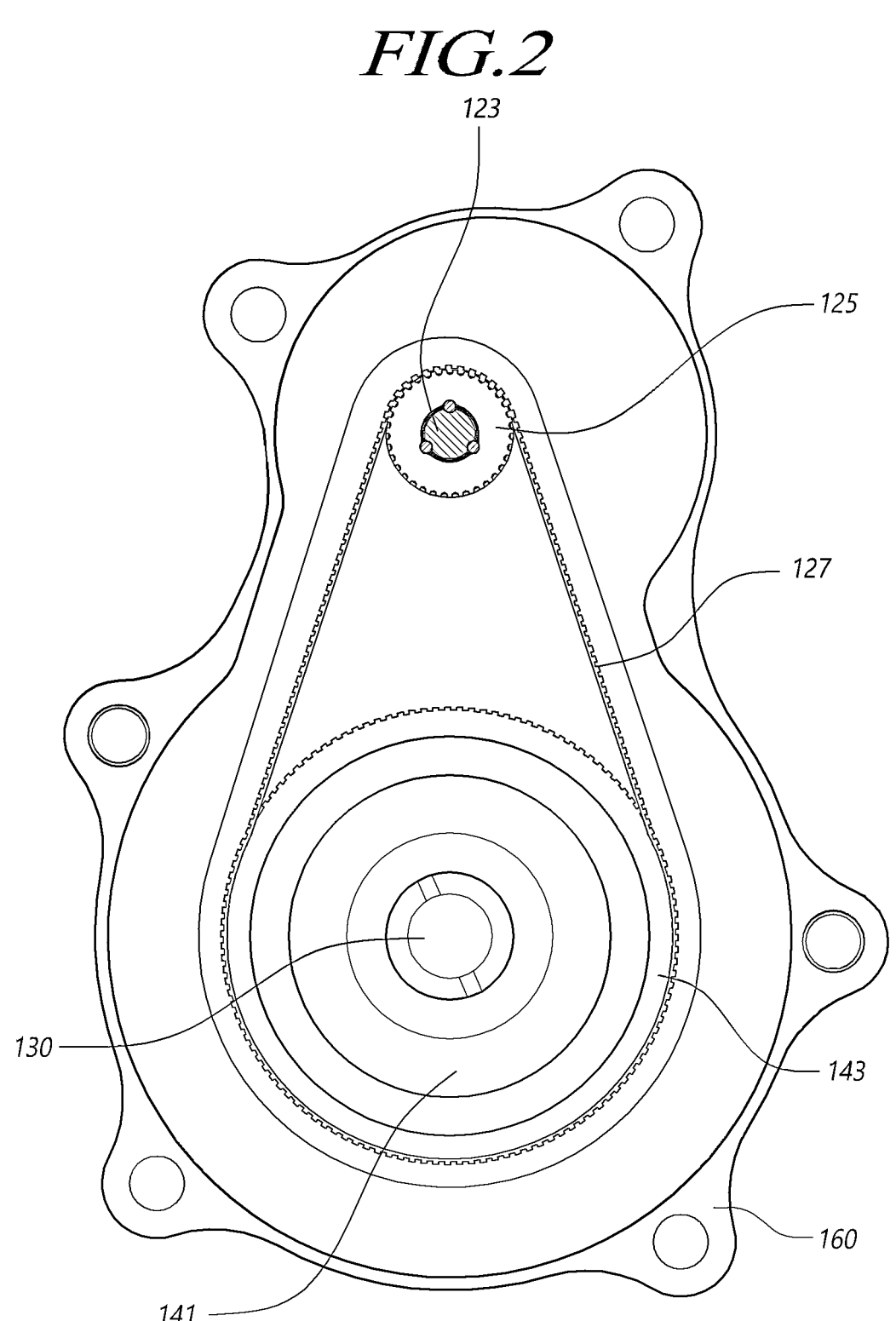
FIG. 2 is a partial side view illustrating a vehicle steering device in a state in which a belt of a vehicle steering device is mounted on a driving pulley and a driven pulley according to an embodiment of the present disclosure.
Figure 3:
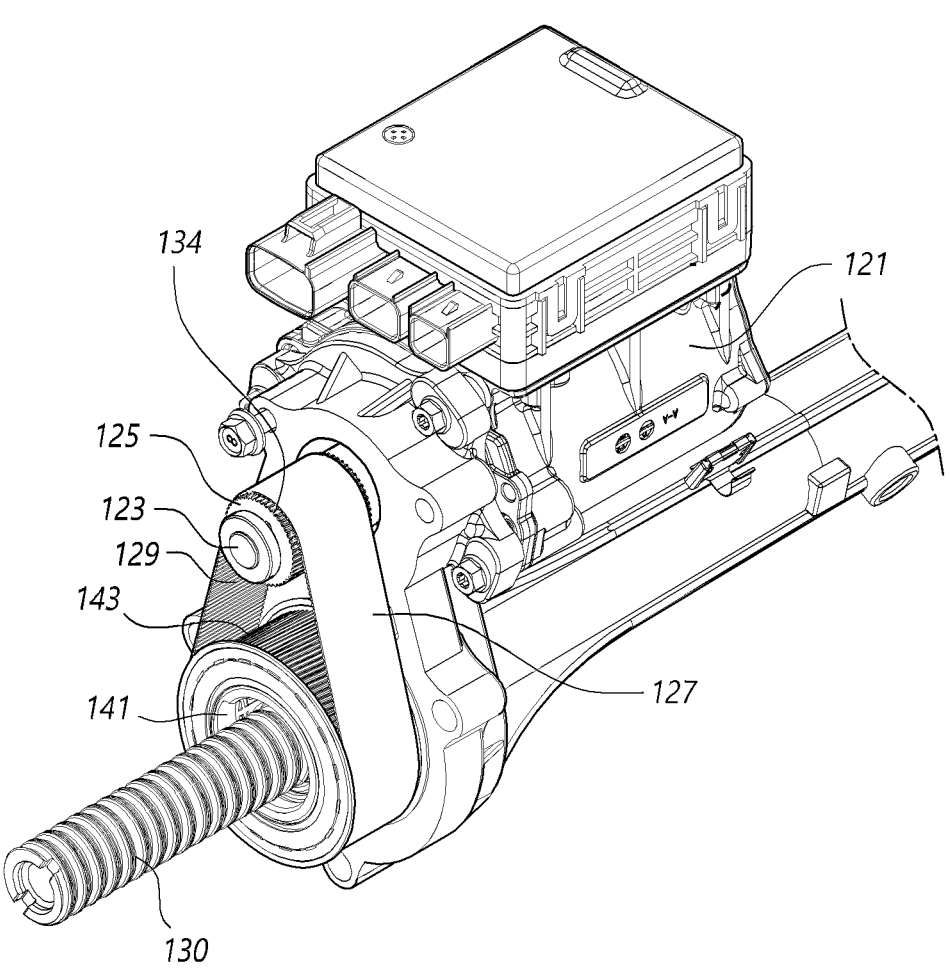
FIGS. 3 and 4 are partial perspective views illustrating a vehicle steering device in a state in which a belt of a vehicle steering device is mounted on a driving pulley and a driven pulley according to an embodiment of the present disclosure.
Figure 4:
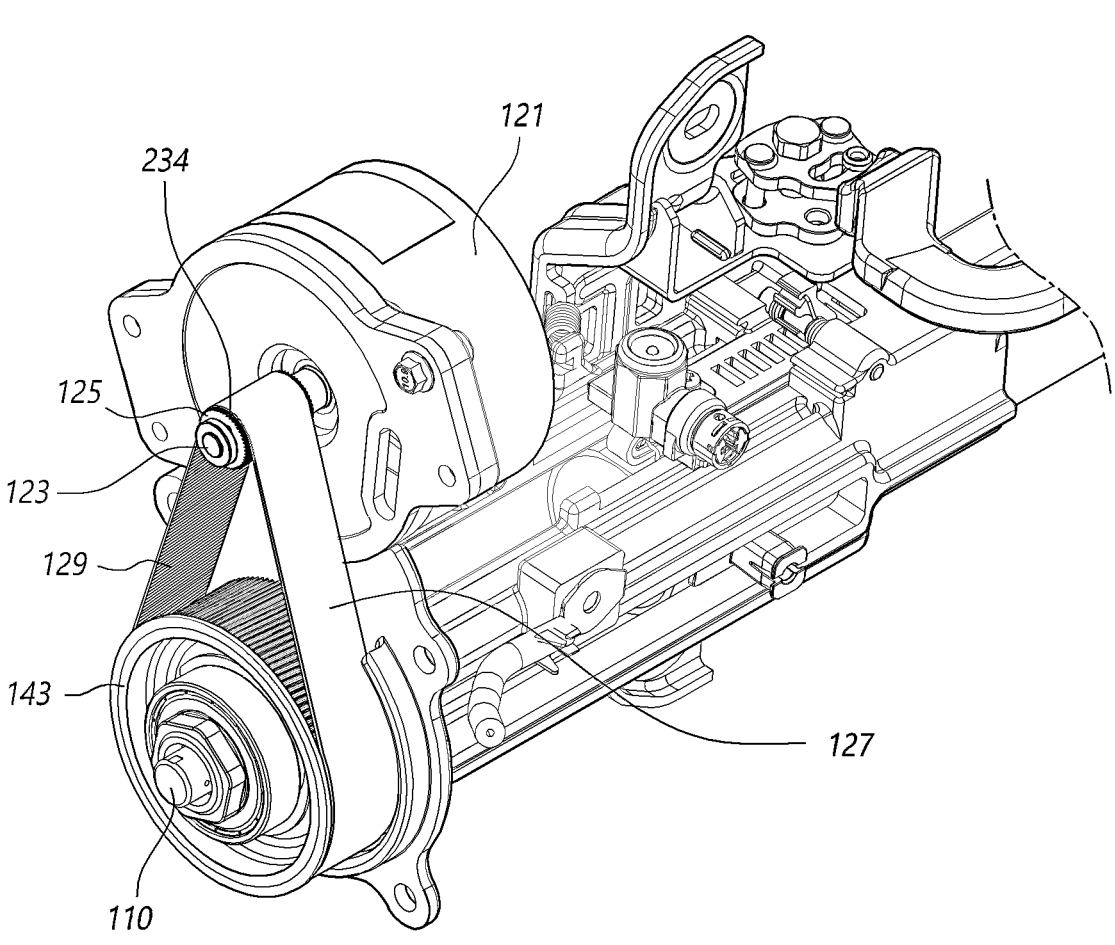
Figure 5:
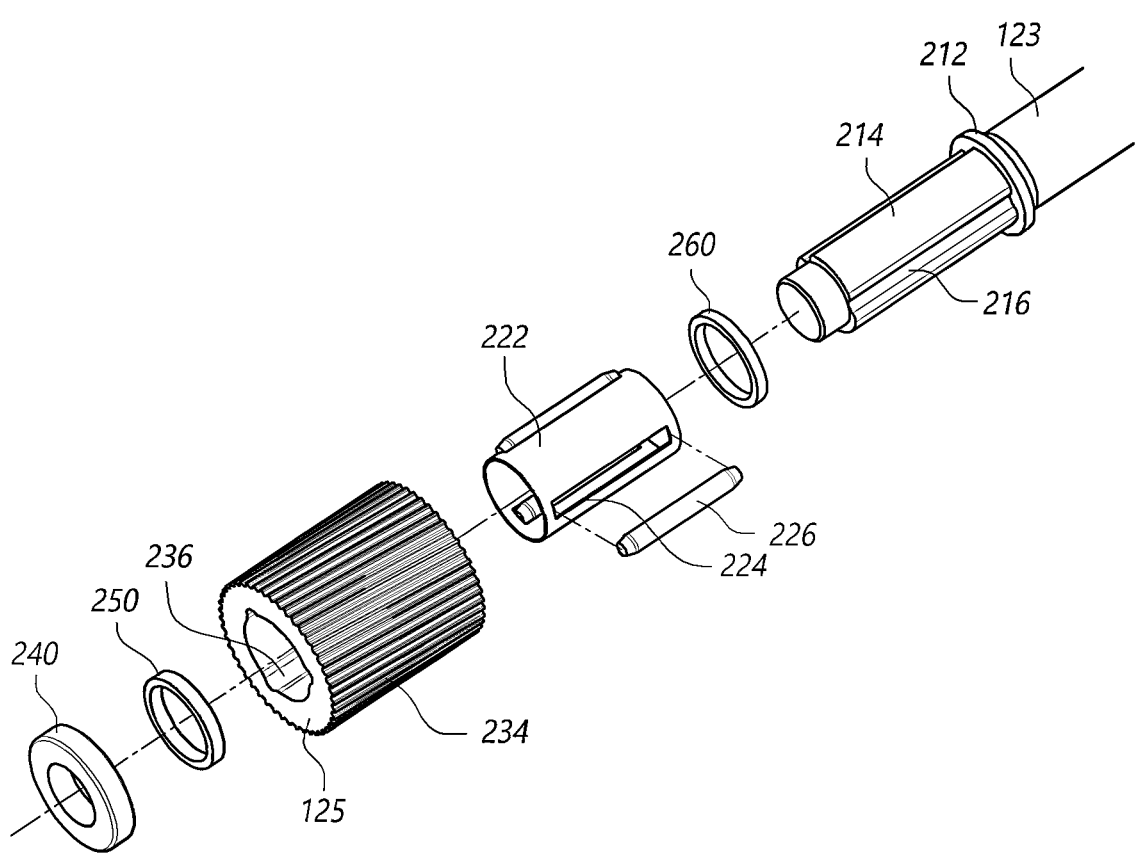
FIG. 5 is an exploded perspective view for illustrating a portion of a vehicle steering device according to an embodiment of the present disclosure.
Figure 6:
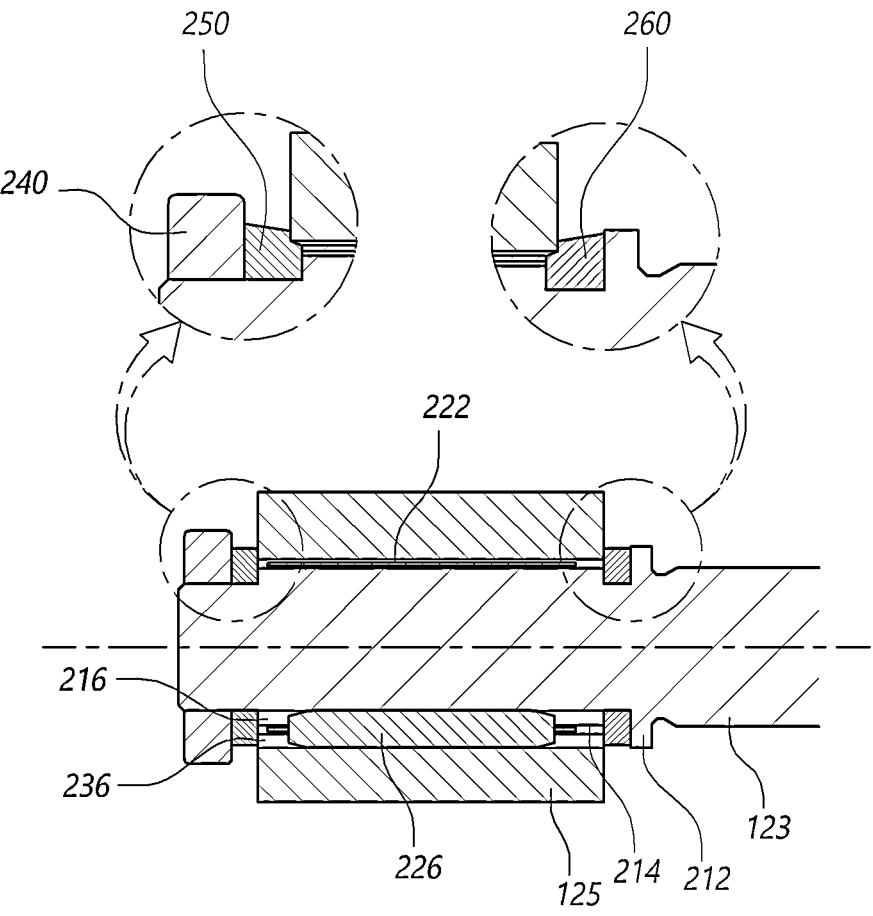
FIG. 6 is a cross-sectional view for illustrating a portion of a vehicle steering device according to an embodiment of the present disclosure.
Figure 7:
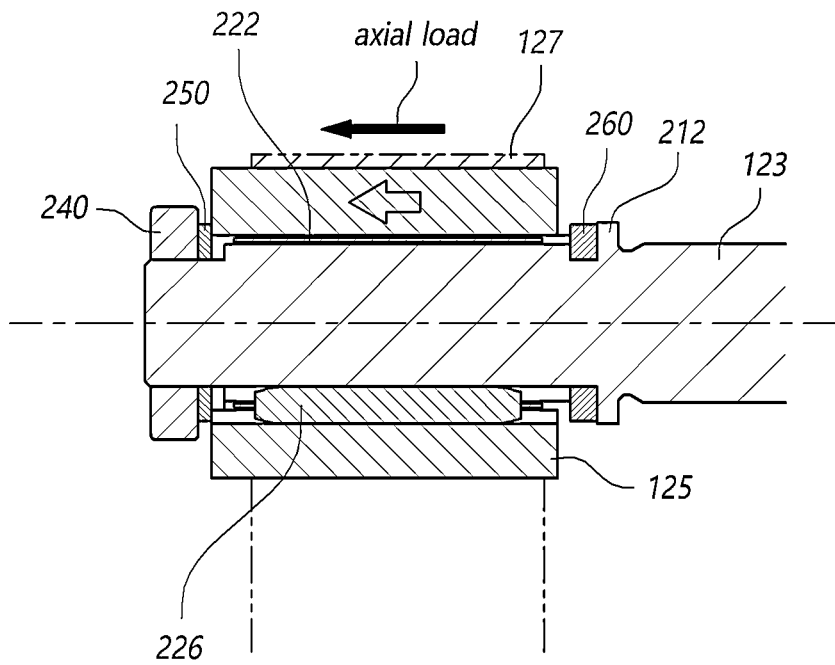
FIGS. 7 and 8 are views illustrating examples of operations of a vehicle steering device according to an embodiment of the present disclosure.
Figure 8:
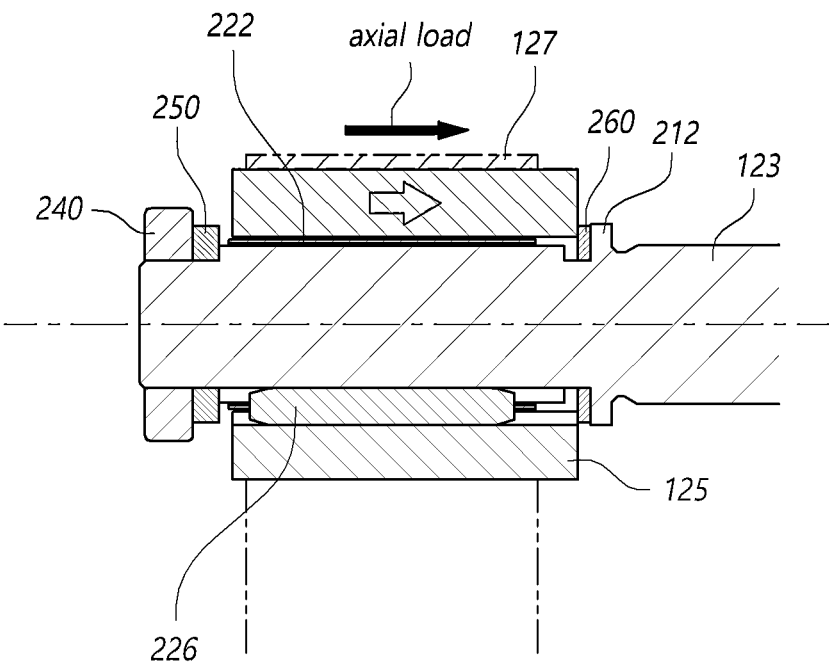
Figure 9:
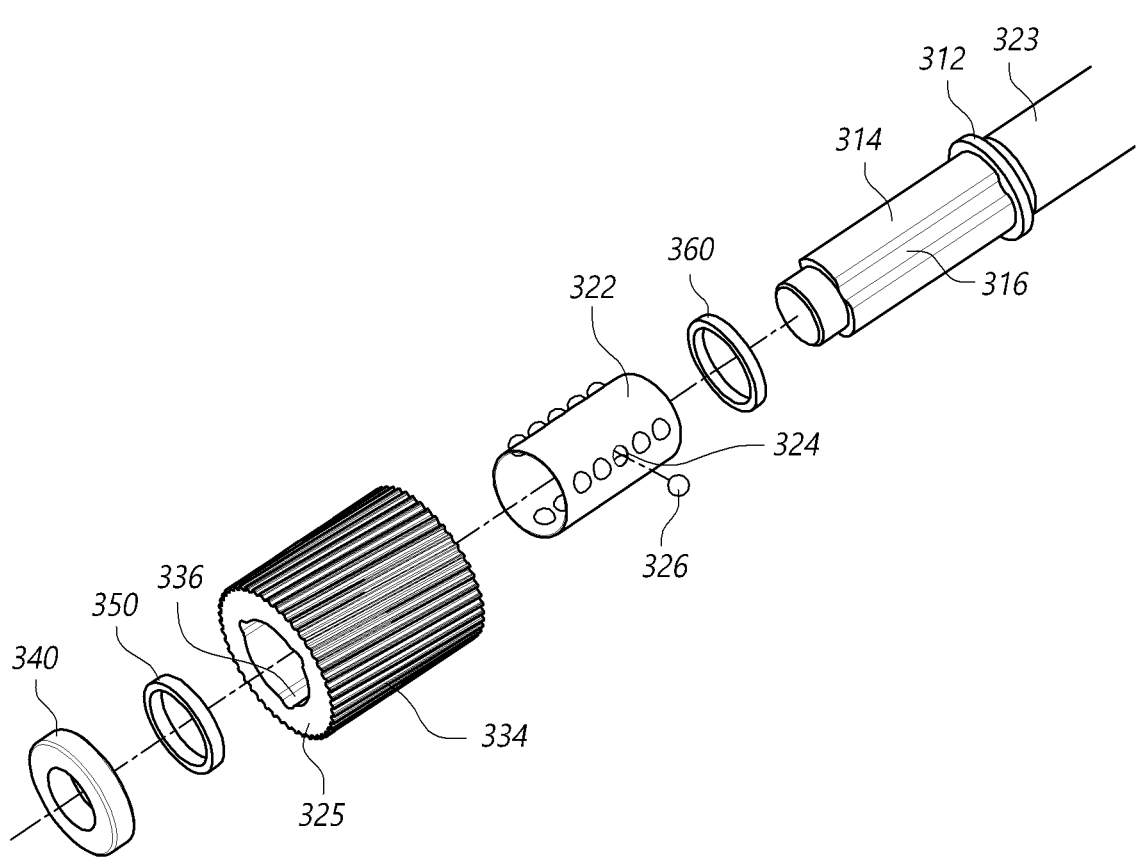
FIG. 9 is an exploded perspective view for illustrating a portion of a vehicle steering device according to another embodiment.
Figure 10:
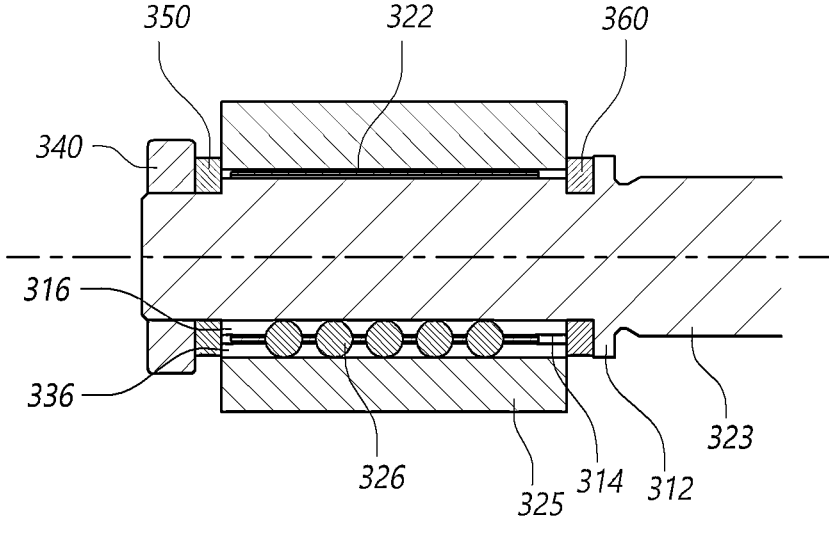
FIG. 10 is a cross-sectional view illustrating a portion of a vehicle steering device according to another embodiment of the present disclosure.
Figure 11:
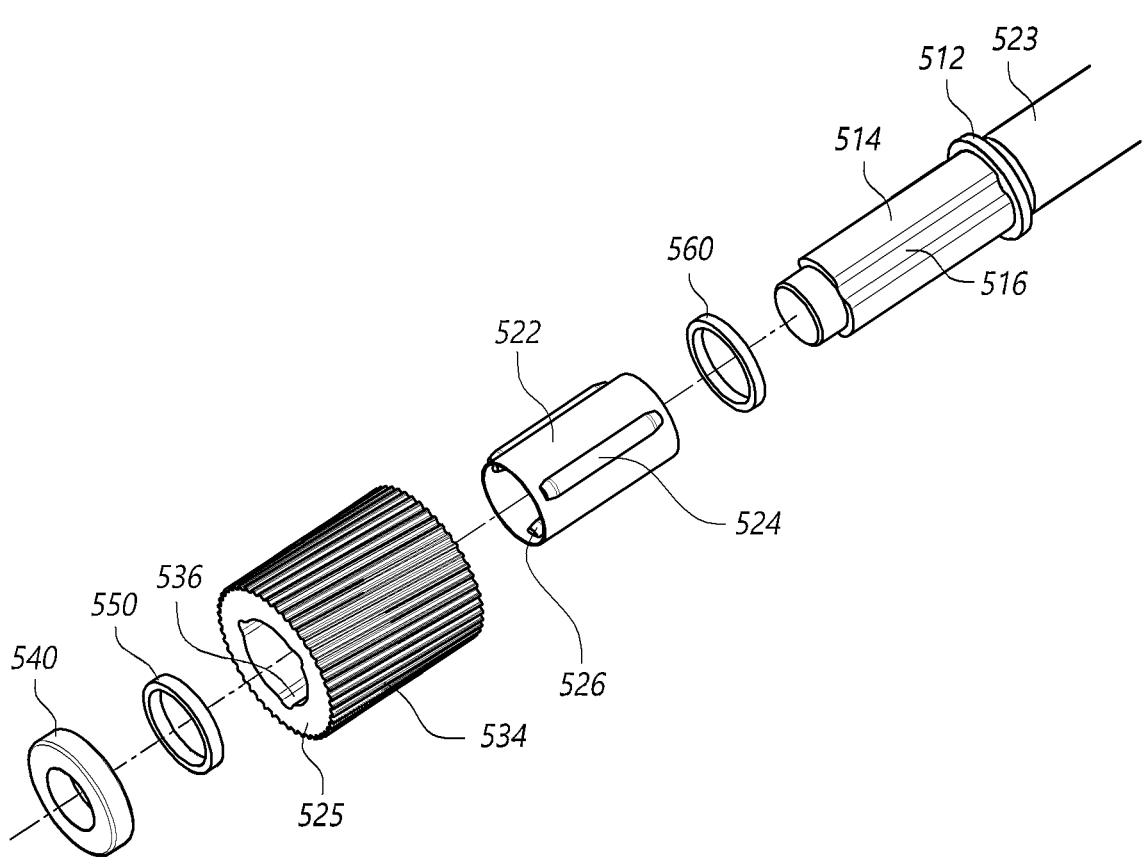
FIG. 11 is an exploded perspective view for illustrating a portion of a vehicle steering device according to still another embodiment of the present disclosure.
Figure 12:
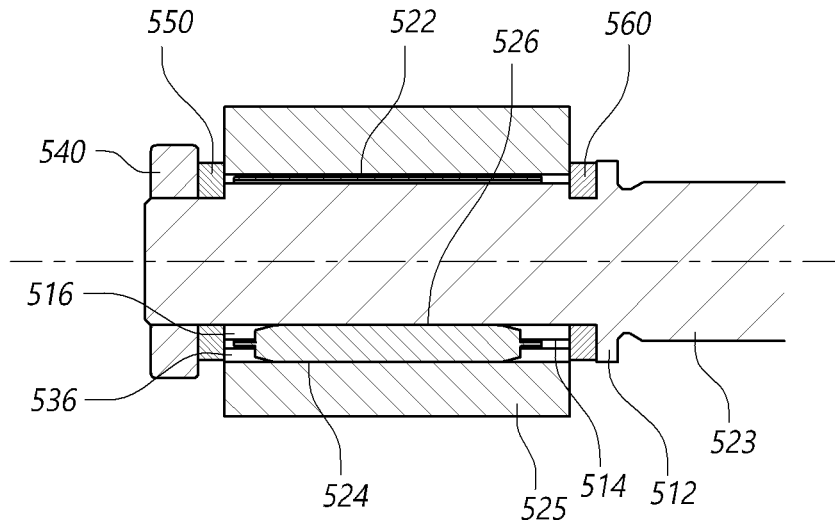
FIG. 12 is a cross-sectional view illustrating a portion of a vehicle steering device according to still another embodiment of the present disclosure.

FIG. 1 is a partial cross-sectional view illustrating a vehicle steering device according to an embodiment of the present disclosure. FIG. 2 is a partial side view illustrating a vehicle steering device in a state in which a belt of a vehicle steering device is mounted on a driving pulley and a driven pulley according to an embodiment of the present disclosure. FIGS. 3 and 4 are partial perspective views illustrating a vehicle steering device in a state in which a belt of a vehicle steering device is mounted on a driving pulley and a driven pulley according to an embodiment of the present disclosure. FIG. 5 is an exploded perspective view for illustrating a portion of a vehicle steering device according to an embodiment of the present disclosure. FIG. 6 is a cross-sectional view for illustrating a portion of a vehicle steering device according to an embodiment of the present disclosure. FIGS. 7 and 8 are views illustrating examples of operations of a vehicle steering device is used according to an embodiment of the present disclosure. FIG. 9 is an exploded perspective view for illustrating a portion of a vehicle steering device according to another embodiment. FIG. 10 is a cross-sectional view illustrating a portion of a vehicle steering device according to another embodiment of the present disclosure. FIG. 11 is an exploded perspective view for illustrating a portion of a vehicle steering device according to another embodiment of the present disclosure. FIG. 12 is a cross-sectional view illustrating a portion of a vehicle steering device according to still another embodiment of the present disclosure.

Vehicle steering devices include motor power assisted steering devices that assist the driver's manipulation of the steering wheel by a motor to provide the convenience of steering and/or steer-by-wire (SBW) steering devices that perform vehicle steering using a motor.

Some embodiments of the present disclosure can be applied to belt-type motor devices, such as column-type motor power assisted steering devices, rack driven motor power assisted steering devices, or steer-by-wire steering devices, but not limited thereto.

Hereinafter, as an example, exemplary embodiments of a structure of a rack driven motor power assisted steering device are described.

Referring to FIGS. 1 and 2, a vehicle steering device includes a driving means 120, a rack bar 130, and driven means 140. The driving means 120 is controlled by an electronic control unit (ECU), which determines the degree of steering based on steering information from various sensors such as a steering angle sensor, a torque sensor, and a velocity sensor, to generate power. the rack bar 130 is configured be movable left or right according to the degree of steering of the steering wheel. The driven means 140 is configured to receive the rotational force from the driving means 120, converts the rotational force into linear moving force and transfers the linear moving force.

The driving means 120 includes a motor 121 controlled by the ECU, a driving pulley 125 coupled to a motor shaft 123 of the motor 121, and a belt 127 wound around the driving pulley 125. The driven means 140 has a ball nut 141 rotatably supporting the rack bar 130 via a bearing 150 inside a rack housing 160 surrounding the rack bar 130. A driven pulley 143 is coupled to the outer circumferential surface of the ball nut 141.

The driving pulley 125 coupled to the motor shaft 123 of the motor 121 and the driven pulley 143 coupled to the ball nut 141 are disposed parallel to each other, and the belt 127 is wound around both the driving pulley 125 and the driven pulley 143 to transfer the rotational force of the motor 121 to the ball nut 141. The rack bar 130 is configured to movable left and right by the operation of the ball nut 141 in order to generate an assisting force.

In an embodiment of the rack driven power assisted steering device shown in FIG. 3, if the motor shaft 123 is rotated to drive the belt 127 to rotate the ball nut 141 upon steering, force is applied in the axial direction of the motor shaft 123 between the belt 127 and the driving pulley 125 by a stopping groove 134 spirally formed on or in the outer circumferential surface of the driving pulley 125 and a stopping protrusion 129 obliquely formed on the belt 127 to correspond to the stopping groove 234 of the driving pulley 125.

Further, in an embodiment of the steer-by-wire steering device shown in FIG. 4, if the motor shaft 123 rotates to drive the belt 127 to rotate the steering shaft 110 upon steering, force is applied in the axial direction of the motor shaft 123 between the belt 127 and the driving pulley 125 by a stopping groove 234 spirally formed on or in the outer circumferential surface of the driving pulley 125 and a stopping protrusion 129 obliquely formed on the belt 127 to correspond to the stopping groove 234 of the driving pulley 125.

If an axial load is generated by the rotation of the motor shaft 123 between the belt 127 and the driving pulley 125, the belt 127 may slip off in the axial direction of the motor shaft 123.

In this case, in an embodiment of the present disclosure, the driving pulley 125 can move in the axial direction of the motor shaft 123 to support the belt 127, thereby preventing the belt 127 from slipping off.

Referring to FIGS. 5 and 6, a vehicle steering device according to an embodiment of the present disclosure includes a motor 121, a guide busing 222, a driving pulley 125, and a supporting member. The motor 121 have a motor shaft 123. The motor shaft 123 has a large diameter portion 212 and a small diameter portion 214 axially extending from an end portion of the large diameter portion 212 to a side. The small diameter portion 214 of the motor shaft 123 may have a fitting groove 216 on or in an outer circumferential surface of the small diameter portion 214. The guide bushing 222 has a hollow shape and is coupled to the small diameter portion 214 of the motor shaft 123. The driving pulley 125 is installed on the guide bushing 222 to be axially movable and has a support groove 236 in an inner circumferential surface of the driving pulley 125 at a position corresponding to the fitting groove 216. The supporting member is coupled to the guide bushing 222, protrudes outward from an outer circumferential surface of the guide bushing 222, and protrudes inward from an inner circumferential surface of the guide bushing 222 to fit into the fitting groove 216 of the motor shaft 123 and the support groove 236 of the driving pulley 125. The motor 121 includes a plurality of fitting grooves 216 formed on or in an outer circumferential surface of the small diameter portion 214 of the motor shaft 123 continuously from one side to another side of the small diameter portion 214 and arranged along a circumferential direction. The guide bushing 222 includes a plurality of slits 224 cut through an inner circumferential surface and outer circumferential surface of the guide bushing 222, at positions corresponding to the fitting grooves 216, along the circumferential direction. The driving pulley 125 includes a plurality of support grooves 236 formed on or in an inner circumferential surface of the driving pulley 125, at positions corresponding to the fitting grooves 216 continuously from one side to another side of the driving pulley 125, along the circumferential direction. The supporting member includes a support pin 226 protruding outward from or of the outer circumferential surface of the guide bushing 222 and protruding inward from or of the inner circumferential surface of the guide bushing 222 to fit into the fitting groove 216 of the motor shaft 123 and the support groove 236 of the driving pulley 125.

In an embodiment of the present disclosure, the slits 224 are continuously formed from one side to another side of the guide bushing 222. The support pin 226 is axially elongated to be fitted into the slit 224.

The motor 121 has the motor shaft 123 extending outward from the inside of the motor 121. The motor shaft 123 has the large diameter portion 212 formed in an enlarged diameter shape having a larger diameter than the small diameter portion 214 and the small diameter portion 214 formed in a reduced diameter shape having a smaller diameter than the large diameter portion 212 and extending from one end of the large diameter portion 212 in the axial direction.

the motor shaft 123 has the fitting groove 216 to or by which the support pin 226 is fitted or supported and which is formed in a long groove shape continuously from one side to the other side on or in the outer circumferential surface of the small diameter portion 214 of the motor shaft.

Here, one or more fitting grooves 216 may be formed on or in the outer circumferential surface of the small diameter portion 214 of the motor shaft 123. For example, three fitting grooves 216 are formed on or in the outer circumferential surface of the small diameter portion 214 to be spaced apart from each other by regular intervals along the circumferential direction.

The guide bushing 222 has a hollow shape and is coupled to the small diameter portion 214 of the motor shaft 123. The guide bushing 222 is formed of a low-friction material and supports axial movement of the driving pulley 125. Low-friction materials may include Poly Acetal (Poly Oxy Methylene, POM), Polyamide (PA), Polycarbonate (PC), Polyimide (PI), Poly Butylene Terephthalate (PBT).

The guide bushing 222 is formed in a long hole continuously from one side to the other side, at the position corresponding to the fitting groove 216 of the motor shaft 123, to be cut through the inner circumferential surface and outer circumferential surface of the guide bushing 222.

One or more slits 224 may be formed in the guide bushing 222. For instance, three slits 224 are formed in the outer circumferential surface of the guide bushing 222 to be spaced apart from each other by regular intervals along the circumferential direction.

The driving pulley 125 is installed to be axially movable on the guide bushing 222. The driving pulley 125 has a support groove 236 formed, in a long groove shape, on or in the inner circumferential surface continuously from one side to the other side of the guide bushing 222, at the position corresponding to the fitting groove 216 of the motor shaft 123.

Here, one or more support grooves 236 may be formed on or in the inner circumferential surface of the driving pulley 125. For example, three support grooves 236 are formed on or in the inner circumferential surface of the driving pulley 125 to be spaced apart from each other by regular intervals along the circumferential direction.

The supporting member is coupled to the guide bushing 222 and protrudes outward from or of the outer circumferential surface of the guide bushing 222 and protrudes inward from or of the inner circumferential surface of the guide bushing 222 to be fitted into the fitting groove 216 of the motor shaft 123 and the support groove 236 of the driving pulley 125.

For example, the supporting member includes the support pin 226 that is axially elongated to be fitted into the slit 224 of the guide bushing 222, that protrudes outward from or of the outer circumferential surface of the guide bushing 222 and protrudes from or inward of the inner circumferential surface of the guide bushing 222 to be fitted into the fitting groove 216 of the motor shaft 123 and the support groove 236 of the driving pulley 125.

The support pin 226 is fitted into the slit 224 of the guide bushing 222, protrudes outward from or of the outer circumferential surface of the guide bushing 222 and protrudes inward from or of the inner circumferential surface of the guide bushing 222 to be fitted into the fitting groove 216 of the motor shaft 123 and the support groove 236 of the driving pulley 125. The support pin 226 supports the driving pulley 125 to rotate along with the motor shaft 123 when the motor shaft 123 rotates in one direction or its opposite direction while guiding the driving pulley 125 to be movable to one side or the other side in the axial direction.

In an embodiment of the present disclosure, the vehicle steering device may further include a first elastic member 250, a second elastic member 260, and a fastening member 240. The first elastic member 250 may have a hollow shape and may be coupled to the small diameter portion 214 of the motor shaft 123 to support the guide bushing 222 and one side of the driving pulley 125. The second elastic member 260 may have a hollow shape, and may be coupled to the small diameter portion 214 of the motor shaft 123 to support the guide bushing 222 and another side of the driving pulley 125. The fastening member 240 may be coupled to one end portion of the small diameter portion 214 of the motor shaft 123 to support one side of the first elastic member 250.

The first elastic member 250 has an outer diameter that decreases from one side to another side of the first elastic member 250, and, in contrast, the second elastic member 260 has an outer diameter that increases from one side to another side of the second elastic member 260.

The first elastic member 250 may have a hollow shape, be coupled to the small diameter portion 214 of the motor shaft 123, and be supported by the fastening member 240 to support one side of the driving pulley 125. If the driving pulley 125 is moved to one side to apply pressure by the axial load, the axial width of the first elastic member 250 is changed by the applied force and, when the force by the axial load is removed, the first elastic member 250 is returned to its original state, and pushes the driving pulley 125 toward the second elastic member 260 to be positioned between the first elastic member 250 and the second elastic member 260.

For example, as shown in FIG. 7, if the motor shaft 123 is rotated in one direction, force is applied axially between the belt 127 and the driving pulley 125 by the stopping groove 234 spirally formed on or in the outer circumferential surface of the driving pulley 125 and the stopping protrusion 129 obliquely formed on the belt 127 to correspond to the stopping groove 234 of the driving pulley 125, so that an axial load is generated to the driving pulley 125 in one direction.

Here, the driving pulley 125 moves to one side to press the first elastic member 250, thereby reducing the axial width of the first elastic member 250.

When the force by the axial load is removed, the first elastic member 250 is returned to its original state, pushes the driving pulley 125 toward the second elastic member 260 to be positioned between the first elastic member 250 and the second elastic member 260.

For instance, the first elastic member 250 may have an outer diameter decreasing from one side to the other side of the first elastic member 250, and a portion of the first elastic member 250 is inserted into the driving pulley 125 to simultaneously support the driving pulley 125 and the guide bushing 222.

The second elastic member 260 may have a hollow shape, be coupled to or seated on the small diameter portion 214 of the motor shaft 123, and be supported by the large diameter portion 212 of the motor shaft 123 to support the other side of the driving pulley 125. If the driving pulley 125 is moved to the other side to apply pressure by the axial load, the axial width of the second elastic member 260 is changed by the applied force. When the force by the axial load is removed, the second elastic member 260 is returned to its original state, and pushes the driving pulley 125 toward the first elastic member 250 to be positioned between the first elastic member 250 and the second elastic member 260.

Specifically, as shown in FIG. 8, if the motor shaft 123 is rotated in the opposite direction, force is applied axially between the belt 127 and the driving pulley 125 by the stopping groove 234 spirally formed on or in the outer circumferential surface of the driving pulley 125 and the stopping protrusion 129 obliquely formed on the belt 127 to correspond to the stopping groove 234 of the driving pulley 125, so that an axial load is generated to the driving pulley 125 in the other direction.

Here, the driving pulley 125 moves to the other side to press the second elastic member 260, thereby reducing the axial width of the second elastic member 260.

When the force by the axial load is removed, the second elastic member 260 is returned to its original state, and pushes the driving pulley 125 toward the first elastic member 250 to be positioned between the first elastic member 250 and the second elastic member 260.

In this case, the second elastic member 260 is formed to have an outer diameter increasing from one side to the other of the second elastic member 260, and a portion of the second elastic member 260 is inserted into the driving pulley 125 to simultaneously support the driving pulley 125 and the guide bushing 222.

Accordingly, according to an embodiment of the present disclosure, as illustrated in FIG. 7, the driving pulley 125 is moved to one side in the axial direction (e.g. a first direction) if the motor shaft 123 is rotated in one direction to generate an axial load to one side (e.g. the first direction). As shown in FIG. 8, the driving pulley 125 is moved to the other side in the axial direction (e.g. a second direction opposite to the first direction) if the motor shaft 123 is rotated in the opposite direction to generate an axial load to the other side. As illustrated in FIG. 6, the driving pulley 125 is positioned between the first elastic member 250 and the second elastic member 260 by the elastic force of the first elastic member 250 and the second elastic member 260 if no axial load is generated.

Here, the first elastic member 250 and the second elastic member 260 may be formed of a material such as natural rubber (NR), nitrile butadiene rubber (NBR), chloroprene rubber (CR), ethylene fluoro rubber propylene terpolymer (EPDM), (FPM), styrene butadiene rubber (SBR), chlorosulphonated polyethylene (CSM), urethane, Teflon, silicone, or the like.

The fastening member 240 is coupled to one end portion of the small diameter portion 214 of the motor shaft 123 to support one side of the first elastic member 250, and may be press-fitted to, or fastened through a threaded portion, one end of the small diameter portion 214 of the motor shaft 123.

As an example, the small diameter portion 214 may have a threaded portion with ridges and valleys on or in the outer circumferential surface of one end portion of the small diameter portion 214, and the fastening member 240 may have a threaded portion formed on or in the outer circumferential surface of the fastening member 240 to correspond to the threaded portion of the small diameter portion 214. As the threaded portion formed on or in the inner circumferential surface of the fastening member 240 is engaged with the threaded portion formed on or in the outer circumferential surface of the small diameter portion 214, the fastening member 240 may be fastened to the small diameter portion 214.

If an axial load is generated between the belt 127 and the driving pulley 125 by the rotation of the motor shaft 123, the driving pulley 125 is axially moved to support the belt 127, thereby preventing the belt 127 from slipping off.

Referring to FIGS. 9 and 10, a vehicle steering device according to another embodiment includes a motor 121, a guide bushing 322, a driving pulley 325, and a supporting member. The motor 121 may be provided with a motor shaft 323 having a large diameter portion 312 and a small diameter portion 314 axially extending from an end portion of the large diameter portion 312 to a side and having a fitting groove 316 on or in an outer circumferential surface of the small diameter portion 314. The guide bushing 322 may have a hollow shape and be coupled to the small diameter portion 314 of the motor shaft 323. The driving pulley 325 may be mounted to or installed on the guide bushing 322 to be axially movable and have a support groove 336 on or in an inner circumferential surface of the driving pulley 325 at a position corresponding to the fitting groove 316. The supporting member may be coupled to the guide bushing 322, protrude outward from or of an outer circumferential surface of the guide bushing 322, protrude inward from or of an inner circumferential surface of the guide bushing 322 to fit into the fitting groove 316 of the motor shaft 323 and the support groove 336 of the driving pulley 325. The motor 121 includes a plurality of fitting grooves 316 continuously formed on or in an outer circumferential surface of the small diameter portion 314 of the motor shaft 323 from one side to another side along a circumferential direction. The guide bushing 322 includes a plurality of through holes 324 formed through an inner circumferential surface and outer circumferential surface of the guide bushing 322, at positions corresponding to the fitting grooves 316, along the circumferential direction. The driving pulley 325 includes a plurality of support grooves 336 formed on or in an inner circumferential surface of the driving pulley 325, at positions corresponding to the fitting grooves 316 of the motor shaft 323 continuously from one side to another side, along the circumferential direction. The supporting member includes one or more support balls 326 protruding from the outer circumferential surface and inner circumferential surface of the guide bushing 322 to be fitted into the fitting groove 316 of the motor shaft 323 and the support groove 336 of the driving pulley 325.

In an embodiment of the present disclosure, the plurality of through holes 324 are arranged along the axial direction from one side to another side of the guide bushing 322. The support ball 326 may have a spherical shape to be fitted into the through hole 324 of the guide busing 322.

The motor 121 has the motor shaft 323 extending outward from the inside of the motor 121. The motor shaft 323 has the large diameter portion 312 formed in an enlarged diameter shape having a larger diameter than the small diameter portion 314 and the small diameter portion 314 formed in a reduced diameter shape having a smaller diameter than the large diameter portion 312 and extending from one end of the large diameter portion 312 to one side in the axial direction.

The motor shaft 323 has the fitting groove 316 to or by which the support ball 326 is fitted or supported and which is formed in a long groove shape continuously from one side to the other side on or in the outer circumferential surface of the small diameter portion 314.

Here, one or more fitting grooves 316 may be formed on in the outer circumferential surface of the small diameter portion 314 of the motor shaft 323. For example, three fitting grooves 316 are formed on or in the outer circumferential surface of the small diameter portion 314 to be spaced apart from each other by regular intervals along the circumferential direction, but not limited thereto.

The guide bushing 322 has a hollow shape and is coupled to the small diameter portion 314 of the motor shaft 323. The guide bushing 222 is formed of a low-friction material and supports the axial movement of the driving pulley 325.

The guide bushing 322 has a plurality of through holes 324 formed through the inner circumferential surface and outer circumferential surface of the guide bushing 322 to be spaced apart from each other by regular intervals from one side to the other side at the positions corresponding to the fitting grooves 316 of the motor shaft 323.

One or more through holes 324 may be formed in the guide bushing 322. For example, the through holes 324 are formed, in the guide bushing 322, at the positions corresponding to the three fitting grooves 316 of the motor shaft 323 to be spaced apart from each other by regular intervals along the circumferential direction and formed from one side to the other side to be fitted into the three fitting grooves 316 of the motor shaft 323, respectively, but not limited thereto.

The driving pulley 325 is installed to be axially movable on the guide bushing 322. The driving pulley 125 has a support groove 336 having a long groove shape and formed on or in the inner circumferential surface of the driving pulley 325 continuously from one side to the other side, at the position corresponding to the fitting groove 316 of the motor shaft 323.

Here, one or more support grooves 336 may be formed on or in the inner circumferential surface of the driving pulley 325. For instance, three support grooves 336 are formed in the inner circumferential surface of the driving pulley 325 to be spaced apart from each other by regular intervals along the circumferential direction, but not limited thereto.

The supporting member is coupled to the guide bushing 322 and protrudes outward from or of the outer circumferential surface of the guide bushing 322 and protrudes inward from or of the inner circumferential surface of the guide bushing 222 to be fitted into the fitting groove 316 of the motor shaft 323 and the support groove 336 of the driving pulley 325.

In this case, the supporting member includes one or more support balls 326 that has a spherical shape to be fitted into the through hole 324 of the guide bushing 322, that protrudes outward from or of the outer circumferential surface of the guide bushing 322 and protrudes inward from or of the inner circumferential surface of the guide bushing 222 to be fitted into the fitting groove 316 of the motor shaft 323 and the support groove 336 of the driving pulley 325.

The support ball 326 is fitted into the through hole 324 of the guide bushing 322, protrudes outward from or of the outer circumferential surface of the guide bushing 322 and protrudes inward from or of the inner circumferential surface of the guide bushing 222 to be fitted into the fitting groove 316 of the motor shaft 323 and the support groove 336 of the driving pulley 325. The support pin 226 supports the driving pulley 325 to rotate along with the motor shaft 323 when the motor shaft 323 rotates in one direction or its opposite direction while guiding the driving pulley 325 to be movable to one side or the other side in the axial direction.

According to an embodiment of the present disclosure, the vehicle steering device further includes a first elastic member 350, a second elastic member 360, and a fastening member 340. The first elastic member 350 may have a hollow shape and be coupled to the small diameter portion 314 of the motor shaft 323 to support the guide bushing 322 and one side of the driving pulley 325. The second elastic member 360 may have a hollow shape and be coupled to the small diameter portion 314 of the motor shaft 323 to support the guide bushing 322 and another side of the driving pulley 325. The fastening member 340 may be coupled to one end portion of the small diameter portion 314 of the motor shaft 323 to support one side of the first elastic member 350.

In this case, the first elastic member 350 has an outer diameter that decreases from one side to another side, and, in contrast, the second elastic member 360 has an outer diameter that increases from one side to another side.

The first elastic member 350 may have a hollow shape, be coupled to the small diameter portion 314 of the motor shaft 323, and be supported by the fastening member 340 to support one side of the driving pulley 325. If the driving pulley 325 is moved to one side to apply pressure by the axial load, the axial width of the first elastic member 350 is changed by the applied force. When the force by the axial load is removed, the first elastic member 250 is returned to its original state, and pushes the driving pulley 325 toward the second elastic member 360 to be positioned between the first elastic member 250 and the second elastic member 360.

Specifically, if the motor shaft 323 is rotated in one direction, force is applied axially between the belt 127 and the driving pulley 325 by the stopping groove 334 spirally formed on or in the outer circumferential surface of the driving pulley 325 and the stopping protrusion 129 obliquely formed on the belt 127 to correspond to the stopping groove 334 of the driving pulley 325, so that an axial load is generated to the driving pulley 325 in one direction.

Here, the driving pulley 325 moves to one side to press the first elastic member 350, thereby reducing the axial width of the first elastic member 350.

When the force by the axial load is removed, the first elastic member 350 is returned to its original state, and pushes the driving pulley 325 toward the second elastic member 360 to be positioned between the first elastic member 350 and the second elastic member 360.

In this case, the first elastic member 350 is formed to have an outer diameter decreasing from one side to the other of the first elastic member 350, and a portion of the first elastic member 350 is inserted into the driving pulley 325 to simultaneously support the driving pulley 325 and the guide bushing 322.

The second elastic member 360 may have a hollow shape, be coupled to the small diameter portion 314 of the motor shaft 323, and be supported by the large diameter portion 312 of the motor shaft 323 to support the other side of the driving pulley 325. If the driving pulley 325 is moved to the other side to apply pressure by the axial load, the axial width of the second elastic member 360 is changed by the applied force and, when the force by the axial load is removed, the second elastic member 360 is returned to its original state, and pushes the driving pulley 325 toward the first elastic member 250 to be positioned between the first elastic member 250 and the second elastic member 360.

Specifically, if the motor shaft 323 is rotated in the opposite direction, force is applied axially between the belt 127 and the driving pulley 325 by the stopping groove 334 spirally formed on or in the outer circumferential surface of the driving pulley 325 and the stopping protrusion 129 obliquely formed on the belt 127 to correspond to the stopping groove 334 of the driving pulley 325, so that an axial load is generated to the driving pulley 325 in the other direction.

Here, the driving pulley 325 moves to the other side to press the second elastic member 360, thereby reducing the axial width of the second elastic member 360.

When the force by the axial load is removed, the second elastic member 360 is returned to its original state, and pushes the driving pulley 325 toward the first elastic member 350 to be positioned between the first elastic member 350 and the second elastic member 360.

In this case, the second elastic member 360 is formed to have an outer diameter increasing from one side to the other of the second elastic member 360, and a portion of the second elastic member 360 is inserted into the driving pulley 325 to simultaneously support the driving pulley 325 and the guide bushing 322.

Accordingly, according to an embodiment of the present disclosure, the driving pulley 325 is moved to one side in the axial direction (e.g. a first direction) if the motor shaft 323 is rotated in one direction to generate an axial load to one side. The driving pulley 325 is moved to the other side in the axial direction (e.g. a second direction opposite to the first direction) if the motor shaft 323 is rotated in the opposite direction to generate an axial load to the other side. The driving pulley 325 is positioned between the first elastic member 350 and the second elastic member 360 by the elastic force of the first elastic member 350 and the second elastic member 360 if no axial load is generated.

The fastening member 340 is coupled to one end portion of the small diameter portion 314 of the motor shaft 323 to support one side of the first elastic member 350, and may be press-fitted, or fastened through a threaded portion, to one end of the small diameter portion 314 of the motor shaft 323.

As an example, the small diameter portion 314 of the motor shaft 323 may have a threaded portion with ridges and valleys on or in the outer circumferential surface of one end portion of the small diameter portion 314, and the fastening member 340 may have a threaded portion formed on or in the outer circumferential surface of the fastening member 340 to correspond to the threaded portion of the small diameter portion 314 of the motor shaft 323. As the threaded portion formed on or in the inner circumferential surface of the fastening member 340 is engaged with the threaded portion formed on or in the outer circumferential surface of the small diameter portion 314 of the motor shaft 323, the fastening member 340 may be fastened to the small diameter portion 314.

If an axial load is generated between the belt 127 and the driving pulley 325 by the rotation of the motor shaft 323, the driving pulley 325 is axially moved to support the belt 127, thereby preventing the belt 127 from slipping off.

Referring to FIGS. 11 and 12, a vehicle steering device according to still another embodiment of the present disclosure may include a motor 121, a guide bussing 522, and a driving pulley 525. The motor 121 may be provided with a motor shaft 523 having a large diameter portion 512 and a small diameter portion 514 axially extending from an end portion of the large diameter portion 512 to a side. The guide bushing 522 may have a hollow shape, be coupled to the small diameter portion 514 of the motor shaft 523, and have a plurality of outer support portions 524 formed along a circumferential direction to protrude from an outer circumferential surface of the guide bushing 522. The driving pulley 525 may be mounted to or installed on the guide bushing 522 to be axially movable and have a plurality of support grooves 536 formed, along the circumferential direction, on or in an inner circumferential surface of the driving pulley 525, at positions corresponding to the outer support portions 524 of the guide bushing 522, to allow the outer support portions 524 to be fitted into the support grooves 536 of the driving pulley 525. The outer support portions 524 are continuously formed on an outer circumferential surface of the guide bushing 522 to radially protrude from one side to another side. The support grooves 536 are continuously formed on or in an inner circumferential surface of the driving pulley 525 from one side to another side to correspond to the outer support portions 524.

According to an embodiment of the present disclosure, the motor 121 includes a plurality of fitting grooves 516 that are continuously formed on or in an outer circumferential surface of the small diameter portion 514 of the motor shaft 523 from one side to another side along a circumferential direction. The guide bushing 522 includes a plurality of inner support portions 526 continuously formed on an inner circumferential surface of the guide bushing 522 along the circumferential direction at positions corresponding to the fitting grooves 516 of the motor shaft 523 to radially protrude from one side to another side to be fitted into the fitting grooves 516.

The motor 121 has the motor shaft 523 extending outward from the inside of the motor 121. The motor shaft 523 has the large diameter portion 512 formed in an enlarged diameter shape having a larger diameter than the small diameter 514 and the small diameter portion 514 formed in a reduced diameter shape having a smaller diameter than the large diameter portion 512 and extending from one end of the large diameter portion 512 to one side in the axial direction.

In this case, the motor shaft 523 has the fitting groove 516 to which the inner support portion 526 of the guide bushing 522 is fitted or inserted and which has a long groove shape continuously from one side to the other side in the outer circumferential surface on or of the small diameter portion 514 of the motor shaft 523.

Here, one or more fitting grooves 516 may be formed on or in the outer circumferential surface of the small diameter portion 514 of the motor shaft 523. For example, three fitting grooves 516 are formed on or in the outer circumferential surface of the small diameter portion 514 to be spaced apart from each other by regular intervals along the circumferential direction, but not limited thereto.

The guide bushing 522 has a hollow shape and is coupled to the small diameter portion 514 of the motor shaft 523. The guide bushing 522 is formed of a low-friction material and supports the axial movement of the driving pulley 525.

The guide bushing 522 has the outer support portion 524 continuously formed on, or protruded from, the outer circumferential surface of the guide bushing 522 to protrude from one side to the other side and the inner support portion 526 continuously formed on the inner circumferential surface to protrude from one side to the other side.

Here, one or more outer support portions 524 may be formed on the outer circumferential surface of the guide bushing 522 to be fitted or inserted into the support grooves 536 of the driving pulley 525. For example, three outer support portions 524 are formed on the outer circumferential surface of the guide bushing 522 to be spaced apart from each other by regular intervals, at the positions corresponding to the support grooves 536 of the driving pulley 525, along the circumferential direction, but not limited thereto.

One or more inner support portions 526 may be formed on, or protruded from, the inner circumferential surface of the guide bushing 522 to be fitted into the fitting grooves 516 of the motor shaft 523. For example, three inner support portions 526 are formed on the inner circumferential surface of the guide bushing 522 to be spaced apart from each other by regular intervals, at the positions corresponding to the fitting grooves 516 of the motor shaft 523, along the circumferential direction, but not limited thereto.

Alternatively, the guide bushing 522 may be press-fitted, or fastened and coupled to the small diameter portion 514 of the motor shaft 523, without the inner support portion 526.

The driving pulley 525 is installed to be axially movable on the guide bushing 522. The driving pulley 525 has a support groove 536 having a long groove shape, and formed on or in the inner circumferential surface of the driving pulley 525 continuously from one side to the other side, at the position corresponding to the outer support portion 524 of the guide bushing 522.

Here, one or more support grooves 536 may be formed on or in the inner circumferential surface of the driving pulley 525. For example, three support grooves 536 are formed on or in the inner circumferential surface of the driving pulley 525 to be spaced apart from each other by regular intervals along the circumferential direction, but not limited thereto.

The outer support portion 524 protrudes outward from or of the outer circumferential surface of the guide bushing 522 to be fitted or inserted into the support groove 536 of the driving pulley 525, and the inner support portion 526 protrudes inward from or of the inner circumferential surface of the guide bushing 522 to be fitted or inserted into the fitting groove 516 of the motor shaft 523, supporting the driving pulley 525 to rotate along with the motor shaft 523 when the motor shaft 523 rotates in one direction or its opposite direction while guiding the driving pulley 525 to be movable to one side or the other side in the axial direction.

According to an embodiment of the present disclosure, the vehicle steering device further includes a first elastic member 550, a second elastic member 560, and a fastening member 540. The first elastic member 550 may have a hollow shape and be coupled to the small diameter portion 514 of the motor shaft 523 to support the guide bushing 522 and one side of the driving pulley 525. The second elastic member 560 may have a hollow shape and be coupled to the small diameter portion 514 of the motor shaft 523 to support the guide bushing 522 and another side of the driving pulley 525. The fastening member 540 may be coupled to one end portion of the small diameter portion 514 of the motor shaft 523 to support one side of the first elastic member 550.

In this case, the first elastic member 550 has an outer diameter that decrease from one side to another side, and, in contrast, the second elastic member 560 has an outer diameter that increases from one side to another side.

The first elastic member 550 may have a hollow shape, be coupled to the small diameter portion 514 of the motor shaft 523, and be supported by the fastening member 540 to support one side of the driving pulley 525. If the driving pulley 525 is moved to one side to apply pressure by the axial load, the axial width of the first elastic member 550 is changed by the applied force. When the force by the axial load is removed, the first elastic member 250 is returned to its original state, and pushes the driving pulley 525 toward the second elastic member 560 to be positioned between the first elastic member 250 and the second elastic member 560.

Specifically, if the motor shaft 523 is rotated in one direction, force is applied axially between the belt 127 and the driving pulley 525 by the stopping groove 534 spirally formed on or in the outer circumferential surface of the driving pulley 525 and the stopping protrusion 129 obliquely formed on the belt 127 to correspond to the stopping groove 534 of the driving pulley 525, so that an axial load is generated to the driving pulley 525 in one direction.

Here, the driving pulley 525 moves to one side to press the first elastic member 550, thereby reducing the axial width of the first elastic member 550.

When the force by the axial load is removed, the first elastic member 550 is returned to its original state, and pushes the driving pulley 525 toward the second elastic member 560 to be positioned between the first elastic member 550 and the second elastic member 560.

In this case, the first elastic member 550 is formed to have an outer diameter decreasing from one side to the other, and a portion of the first elastic member 550 is inserted into the driving pulley 525 to simultaneously support the driving pulley 525 and the guide bushing 522.

The second elastic member 560 may have a hollow shape, be coupled to the small diameter portion 514 of the motor shaft 523, and be supported by the large diameter portion 512 of the motor shaft 523 to support the other side of the driving pulley 525. If the driving pulley 525 is moved to the other side to apply pressure by the axial load, the axial width of the second elastic member 560 is changed by the applied force. When the force by the axial load is removed, the first elastic member 560 is returned to its original state, and pushes the driving pulley 525 toward the first elastic member 250 to be positioned between the first elastic member 250 and the second elastic member 560.

Specifically, if the motor shaft 523 is rotated in the opposite direction, force is applied axially between the belt 127 and the driving pulley 525 by the stopping groove 534 spirally formed on or in the outer circumferential surface of the driving pulley 525 and the stopping protrusion 129 obliquely formed on the belt 127 to correspond to the stopping groove 534 of the driving pulley 525, so that an axial load is generated to the driving pulley 525 in the other direction.

Here, the driving pulley 525 moves to the other side to press the second elastic member 560, thereby reducing the axial width of the second elastic member 560.

When the force by the axial load is removed, the second elastic member 560 is returned to its original state, and pushes the driving pulley 525 toward the first elastic member 550 to be positioned between the first elastic member 550 and the second elastic member 560.

In this case, the second elastic member 560 is formed to have an outer diameter increasing from one side to the other, and a portion of the second elastic member 560 is inserted into the driving pulley 525 to simultaneously support the driving pulley 525 and the guide bushing 522.

Accordingly, according to an embodiment of the present disclosure, the driving pulley 525 is moved to one side in the axial direction (e.g. a first direction) if the motor shaft 523 is rotated in one direction to generate an axial load to one side. However, the driving pulley 525 is moved to the other side in the axial direction (e.g. a second direction opposite to the first direction) if the motor shaft 523 is rotated in the opposite direction to generate an axial load to the other side. And the driving pulley 525 is positioned between the first elastic member 550 and the second elastic member 560 by the elastic force of the first elastic member 550 and the second elastic member 560 if no axial load is generated.

The fastening member 540 is coupled to one end portion of the small diameter portion 514 of the motor shaft 523 to support one side of the first elastic member 550, and may be press-fitted, fastened through a threaded portion, to one end of the small diameter portion 514.

As an example, the small diameter portion 514 of the motor shaft 523 may have a threaded portion with ridges and valleys on or in the outer circumferential surface of one end portion of the small diameter portion 514, and the fastening member 540 may have a threaded portion formed on or in the outer circumferential surface of the fastening member 540 to correspond to the threaded portion of the small diameter portion 514. As the threaded portion formed on or in the inner circumferential surface of the fastening member 540 is engaged with the threaded portion formed on or in the outer circumferential surface of the small diameter portion 514 of the motor shaft 523, the fastening member 540 may be fastened to the small diameter portion 514.

If an axial load is generated between the belt 127 and the driving pulley 525 by the rotation of the motor shaft 523, the driving pulley 525 is axially moved to support the belt 127, thereby preventing the belt 127 from slipping off.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering device, comprising:
a motor having a motor shaft, wherein the motor shaft has a large diameter portion and a small diameter portion having a smaller diameter than the large diameter portion and axially extending from an end portion of the large diameter portion, and the small diameter portion of the motor shaft has one or more fitting grooves formed on an outer circumferential surface of the small diameter portion of the motor shaft;
a guide bushing having a hollow shape and coupled to the small diameter portion of the motor shaft;
a driving pulley axially movably disposed on the guide bushing and having one or more support grooves on an inner circumferential surface of the driving pulley; and
a supporting member protruding outward from an outer circumferential surface of the guide bushing to be positioned in the one or more support grooves of the driving pulley and protruding inward from an inner circumferential surface of the guide bushing to be positioned in the one or more fitting grooves of the motor shaft.

2. The vehicle steering device of claim 1, wherein:
the guide bushing includes one or more of slits formed at one or more positions corresponding to the one or more fitting grooves of the small diameter portion of the motor shaft,
the one or more support grooves formed on the inner circumferential surface of the driving pulley are formed at one or more positions corresponding to the one or more fitting grooves of the small diameter portion of the motor shaft, and
the supporting member includes one or more support pins protruding outward from the outer circumferential surface of the guide bushing to be positioned in the one or more support grooves of the driving pulley and protruding inward from the inner circumferential surface of the guide bushing to be positioned in the one or more fitting grooves of the small diameter portion of the motor shaft.

3. The vehicle steering device of claim 2,
wherein the one or more support pins have an axially elongated shape and is positioned in the one or more slits of the guide bushing.

4. The vehicle steering device of claim 1, wherein:
the guide bushing includes a plurality of through holes arranged along the one or more fitting grooves of the small diameter portion of the motor shaft,
the one or more support grooves formed on the inner circumferential surface of the driving pulley are formed at one or more positions corresponding to the one or more fitting grooves of the small diameter portion of the motor shaft, and
the supporting member includes a plurality of support balls protruding outward from the outer circumferential surface of the guide bushing to be positioned in the one or more support grooves of the driving pulley and protruding inward from the inner circumferential surface of the guide bushing to be positioned in the one or more fitting groove of the small diameter portion of the motor shaft.

5. The vehicle steering device of claim 4,
wherein the plurality of the support balls are positioned in the plurality of the through holes of the guide bushing.

6. The vehicle steering device of claim 1, further comprising a first elastic member having a hollow shape and coupled to the small diameter portion of the motor shaft to support the guide bushing and one side of the driving pulley.

7. The vehicle steering device of claim 6, wherein the first elastic member has an outer diameter decreasing from one side to another side of the first elastic member.

8. The vehicle steering device of claim 7, further comprising a second elastic member having a hollow shape and coupled to the small diameter portion of the motor shaft to support the guide bushing and another side of the driving pulley.

9. The vehicle steering device of claim 8, wherein the second elastic member has an outer diameter increasing from one side to another side of the second elastic member.

10. The vehicle steering device of claim 9, further comprising a fastening member having a hollow shape and coupled to one end portion of the small diameter portion of the motor shaft to support the one side of the first elastic member.

11. The vehicle steering device of claim 10, wherein the driving pulley is configured to be moved toward the first elastic member if the motor shaft is rotated in one direction to generate an axial load in one direction toward the first elastic member, be moved toward the second elastic member if the motor shaft is rotated in an opposite direction to generate the axial load in another direction toward the second elastic member, and be positioned between the first elastic member and the second elastic member by an elastic force of the first elastic member and the second elastic member if no axial load is generated.

12. A vehicle steering device, comprising:
a motor having a motor shaft, wherein the motor shaft has a large diameter portion and a small diameter portion having a smaller diameter than the large diameter portion and axially extending from an end portion of the large diameter portion;
a guide bushing having a hollow shape and coupled to the small diameter portion of the motor shaft, the guide bushing having one or more outer support portions protruding from an outer circumferential surface of the guide bushing; and
a driving pulley axially movably disposed on the guide bushing and having one or more support grooves formed on an inner circumferential surface of the driving pulley, wherein the one or more outer support portions of the guide bushing are positioned in the one or more support grooves of the driving pulley.

13. The vehicle steering device of claim 12, wherein:
the one or more outer support portions of the guide bushing comprise a plurality of outer support portions arranged along a circumferential direction and radially protruding from the outer circumferential surface of the guide bushing, and
the one or more support grooves of the driving pulley comprise a plurality of support grooves arranged along the circumferential direction at positions corresponding to the plurality of outer support portions of the guiding bushing.

14. The vehicle steering device of claim 12, wherein:
a plurality of fitting grooves are formed on an outer circumferential surface of the small diameter portion of the motor shaft, and
a plurality of inner support portions protrudes from an inner circumferential surface of the guide bushing at positions corresponding to the plurality of fitting grooves of the small diameter portion of the motor shaft to be inserted in the plurality of fitting grooves of the motor shaft.

15. The vehicle steering device of claim 12, further comprising a first elastic member having a hollow shape and coupled to the small diameter portion of the motor shaft to support the guide bushing and one side of the driving pulley.

16. The vehicle steering device of claim 15, wherein the first elastic member has an outer diameter decreasing from one side to another side of the first elastic member.

17. The vehicle steering device of claim 16, further comprising a second elastic member having a hollow shape and coupled to the small diameter portion of the motor shaft to support the guide bushing and another side of the driving pulley.

18. The vehicle steering device of claim 17, wherein the second elastic member has an outer diameter increasing from one side to another side of the second elastic member.

19. The vehicle steering device of claim 18, further comprising a fastening member having a hollow shape and coupled to the one end portion of the small diameter portion of the motor shaft to support the one side of the first elastic member.

20. The vehicle steering device of claim 19, wherein the driving pulley is configured to be moved toward the first elastic member if the motor shaft is rotated in one direction to generate an axial load in one direction toward the first elastic member, be moved toward the second elastic member if the motor shaft is rotated in an opposite direction to generate the axial load in another direction toward the second elastic member, and be positioned between the first elastic member and the second elastic member by an elastic force of the first elastic member and the second elastic member if no axial load is generated.

\* \* \* \* \*